United States Patent
Tseng

(10) Patent No.: US 6,843,488 B1
(45) Date of Patent: Jan. 18, 2005

(54) HAIRDRESSING TOOL CART

(76) Inventor: Su-Lien Tseng, No. 48, Alley 11, Lane 193, Chung-Cheng N. Road, San Chung City, Taipei Hsien (TW)

(*) Notice: Subject to any disclaimer, the term of this patent is extended or adjusted under 35 U.S.C. 154(b) by 0 days.

(21) Appl. No.: 10/640,011

(22) Filed: Aug. 14, 2003

(51) Int. Cl.$^7$ ................................................ B62B 3/02
(52) U.S. Cl. .................................. 280/47.35; 280/79.3
(58) Field of Search .......................... 280/47.35, 47.34, 280/79.2, 79.3, 651, 47.26, 47.19; 206/373; 211/85.8, 88.01, 126.1, 133.1, 200

(56) References Cited

U.S. PATENT DOCUMENTS

| | | | | |
|---|---|---|---|---|
| 2,936,899 A | * | 5/1960 | Tashman .................... | 211/85.4 |
| 4,588,096 A | * | 5/1986 | Story et al. ............. | 211/126.15 |
| 4,795,179 A | * | 1/1989 | Liner ...................... | 280/47.35 |
| 5,531,464 A | * | 7/1996 | Maurer et al. ........... | 280/47.35 |
| 5,875,904 A | * | 3/1999 | Vorstenbosch .............. | 211/180 |
| 5,887,878 A | * | 3/1999 | Tisbo et al. .............. | 280/47.19 |
| 6,443,481 B1 | * | 9/2002 | Stravitz et al. ............ | 280/651 |
| 6,688,615 B2 | * | 2/2004 | Chen ....................... | 280/47.35 |
| 2001/0035702 A1 | * | 11/2001 | Murphy et al. ............. | 312/229 |
| 2001/0052681 A1 | * | 12/2001 | Deavila .................... | 280/47.19 |
| 2002/0067012 A1 | * | 6/2002 | Wise et al. ................. | 280/30 |
| 2002/0096845 A1 | * | 7/2002 | Spann ...................... | 280/79.2 |
| 2003/0155729 A1 | * | 8/2003 | Chen ....................... | 280/47.35 |
| 2004/0004334 A1 | * | 1/2004 | Chen ....................... | 280/47.34 |
| 2004/0119257 A1 | * | 6/2004 | Nelson et al. ........... | 280/47.35 |

* cited by examiner

Primary Examiner—Christopher P. Ellis
Assistant Examiner—J. Allen Shriver
(74) Attorney, Agent, or Firm—Troxell Law Office PLLC

(57) ABSTRACT

A hairdressing tool cart includes a frame including two sub-frames and cross bars extending between and connected to the sub-frames. Two side boards are respectively mounted to inner sides of the sub-frames and form rails on which drawers are movable supported. A receptacle is positioned on and supported by the cross bars. A hanging rack is mounted to an outer side of one sub-frame. A holder is mounted to the outer side of one sub-frame and defines a receiving space. The receptacle, the drawers, the hanging rack and the holder provide spaces for receiving and retaining hairdressing tools and accessories, as well as other articles. Thus, the hairdressing tools and accessories can be well organized with the hairdressing cart.

5 Claims, 5 Drawing Sheets

HAIRDRESSING TOOL CART

FIELD OF THE INVENTION

The present invention generally relates to a hairdressing tool cart, and in particular to a disassembleable hairdressing tool cart structure that allows for well organization of hairdressing tools and accessories.

BACKGROUND OF THE INVENTION

A conventional hairdressing tool cart comprises a frame and two side boards mounted to opposite sides of the frame to define therebetween a space in which drawers are mounted. The frame is comprised of four upright columns located at four corners of a rectangle and a plurality of cross bars connected between the columns. The side boards that are mounted to opposite sides of the frame form a plurality of rails for movably supporting the drawers. Hairdressing tools and accessories are deposited and received in the drawers.

However, since the hairdressing is a complicated process requiring a variety of tools and accessories. Arrangement and management of the tools and accessories is thus difficult. It often takes quite some time for a hairdresser to look for proper ones among the variety of tools and accessories deposited in the drawers of the cart.

Further, the conventional hairdressing cart has a fixed structure. In other words, it is not possible for an ordinary person to disassemble the card and re-arrange the parts of the cart in different ways for suiting different requirements.

Thus, it is desired to have a hairdressing tool cart that overcomes the drawbacks of the prior arts.

SUMMARY OF THE INVENTION

A primary object of the present invention is to provide a disassembleable hairdressing tool cart that allows for disassembly for rearrangement of the parts thereof to suit different requirement and providing better organization of the hairdressing tools and accessories.

To achieve the above and other objects, in accordance with the present invention, there is provided a hairdressing tool cart comprising a frame comprising two sub-frames spaced from each other and cross bars extending between and connected to the sub-frames, each sub-frame comprising two spaced upright posts; two side boards selectively and respectively mounted to inner sides of the sub-frames and having a face opposing each other, each board having opposite edges forming a first fitting section for releasably fitting over inner sides of the posts of the sub-frame, the face of the side board forming a plurality of rails on which drawers are movably supported; a receptacle selectively mounted to the frame and having a bottom on which second fitting sections are formed for releasably fitting over the cross bars thereby supporting the receptacle on the cross bars, the receptacle defining a recessed portion, the receptacle having a face plate in which holes are defined; a hanging rack selectively mounted to an outer side of one sub-frame, the hanging rack having opposite ends each forming a third fitting section releasably fitting over an outer side of the post of the sub-frame, the hanging rack forming hooks; and a holder selectively mounted to the outer side of one sub-frame and defining a space having an entry opening with the sub-frame, the holder having a bottom forming a receiving slot in communication with the space, the holder having opposite edges each forming at least one fourth fitting section releasably fitting over an outer side of the post of the sub-frame.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
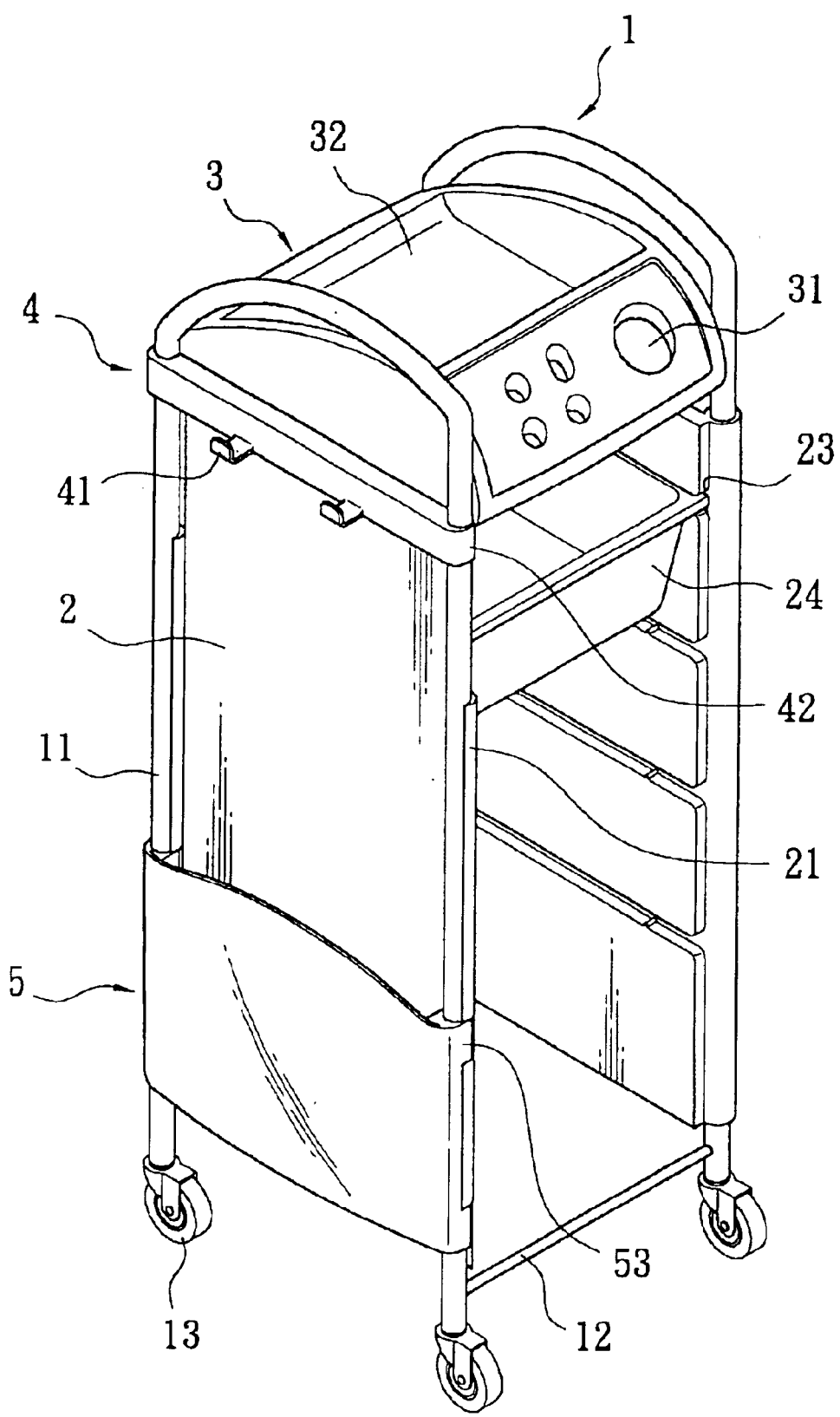
FIG. 1 is a perspective view of a hairdressing tool cart constructed in accordance with the present invention.
Figure 2:
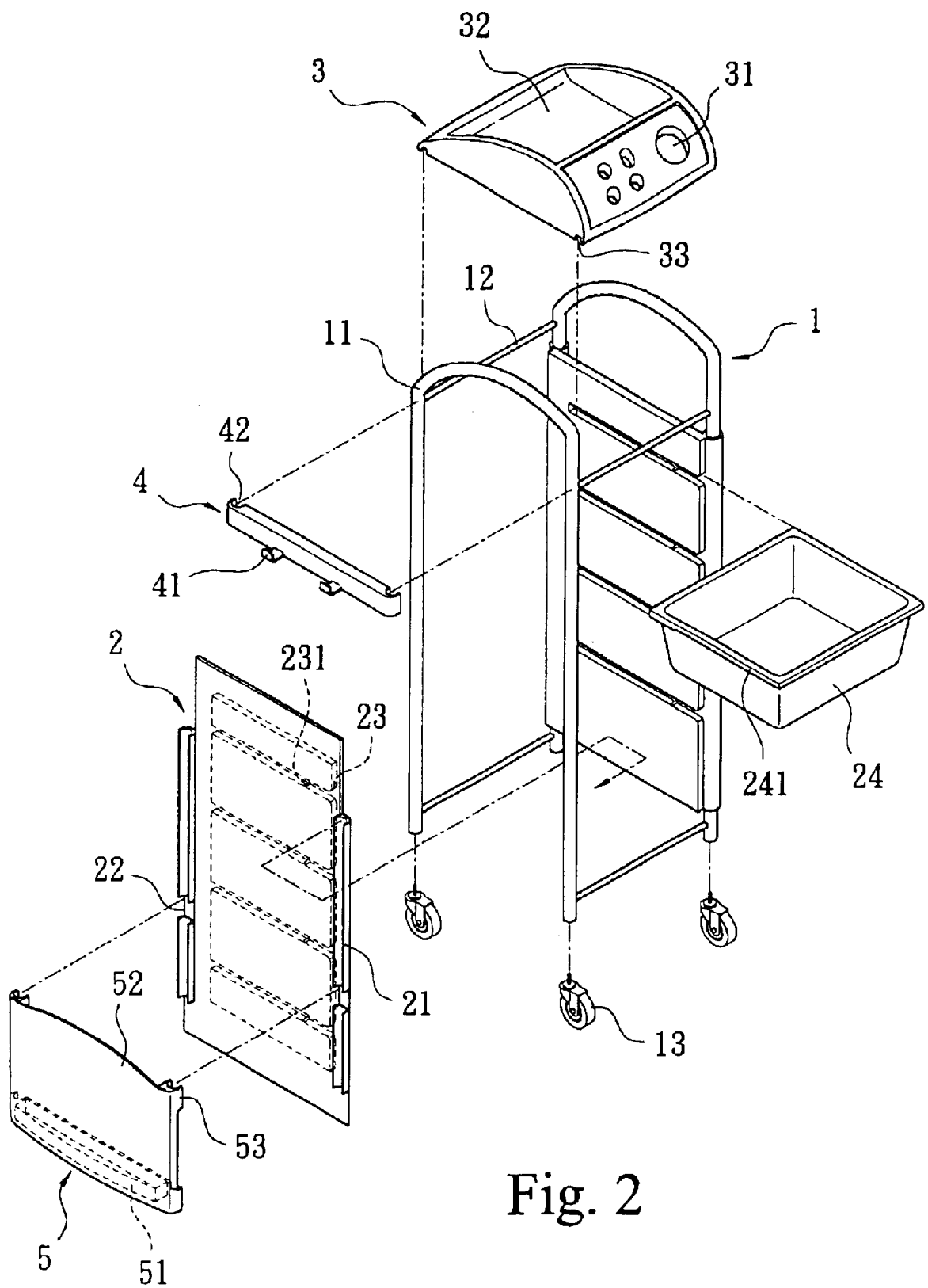
FIG. 2 is an exploded view of the hairdressing tool cart of the present invention.

With reference to the drawings and in particular to FIGS. 1 and 2, a hairdressing tool cart constructed in accordance with the present invention comprises a frame 1 and two side boards 2 mounted to opposite sides of the frame 1. The frame 1 comprises two U-shaped sub-frames 11, each comprised of two spaced and substantially parallel upright posts and an arc connection section straddling top ends of the posts (both not labeled). Preferably, the connection section is inclined from one of the posts toward the other one. Each post has a bottom end to which a caster 13 is mounted for easy movement of the cart on a fixed surface, such as ground. The frame 1 further comprises cross bars 12 extending and connected between the two sub-frames 11.

The side boards 2 are located inboard the frame 1 and mounted to inner sides of the sub-frames 11, respectively. The side board 2 forms elongate, outward facing channel-like fitting sections 21 on opposite lateral edges thereof for removably fitting over the inner sides of the upright posts of the associated sub-frame 11. This mounts the side board 2 to the inner side of the sub-frame 11. A notch 22 is defined in each channel-like fitting section 21 at a predetermined position along the fitting section 21. The side boards 2 have inside surfaces opposing each other. Rails 23 are formed on the inside surfaces of the side boards 2. Drawers 24 are slidably or movably supported on the rails 23 and are guided thereby to move with respect to the frame 1. Hairdressing tools and accessories (not shown) can thus be received and retained in the drawers 24.

Figure 4A:
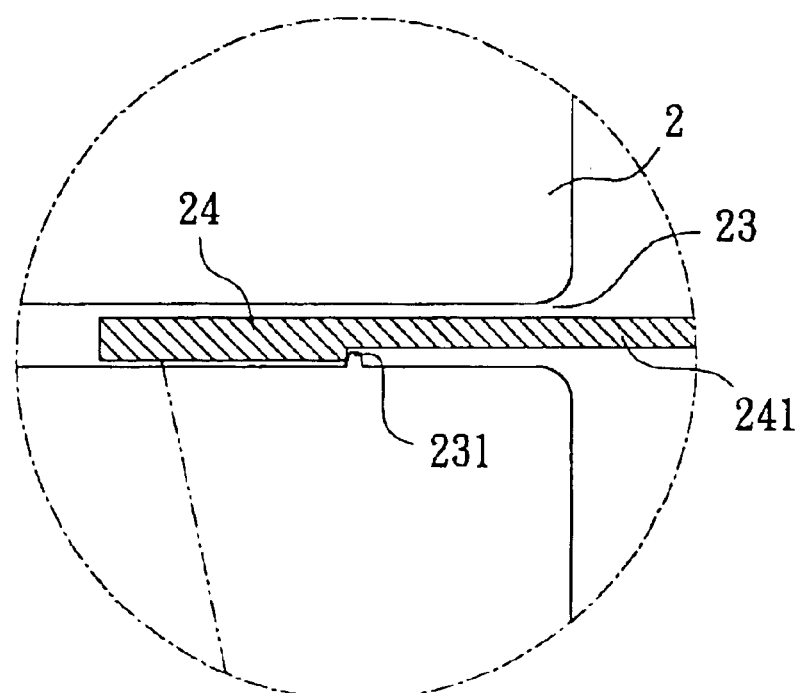
FIG. 4a is an enlarged view, partially sectioned, of a portion of the hairdressing tool cart of the present invention, illustrating the operation relationship between a rail of the frame and a drawer.
Figure 4B:
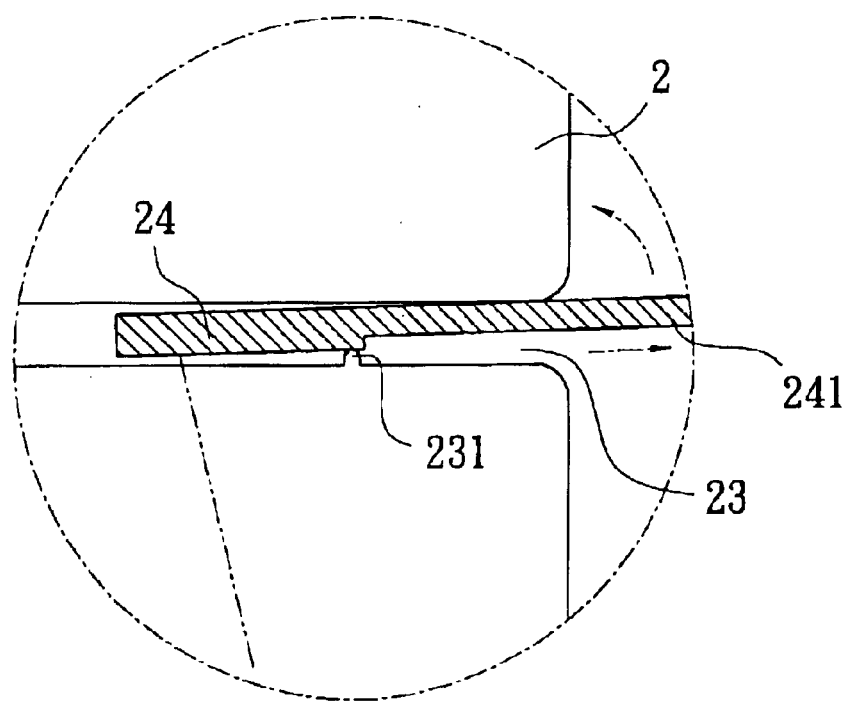
FIG. 4b is similar to FIG. 4a, but showing dismounting the drawer from the frame.

Also referring to FIGS. 4a and 4b, stop blocks 231 are formed on opposite ends of each rail 24. The drawer 24 has an elongate groove 241 defining in a bottom face thereof and forming a shoulder at an end of the groove 241. The drawers 24 are supported by the rails 24 with the stop blocks 231 movably received in the associated grooves 241. The shoulder of each groove 241 is engageable by the stop block 231 to limit the movement of the drawer 24 and thus preventing the drawer 24 from being unexpectedly separated from the frame 1.

To remove the drawer 24 out of the frame 1, the drawer 24 is lifted slightly to get the stop block 231 of the rail 23 out of the groove 241 as shown in FIG. 4b. The drawer 24 is thus separated from the stop block 231 and can be readily removed out of the frame 1.

Figure 5:
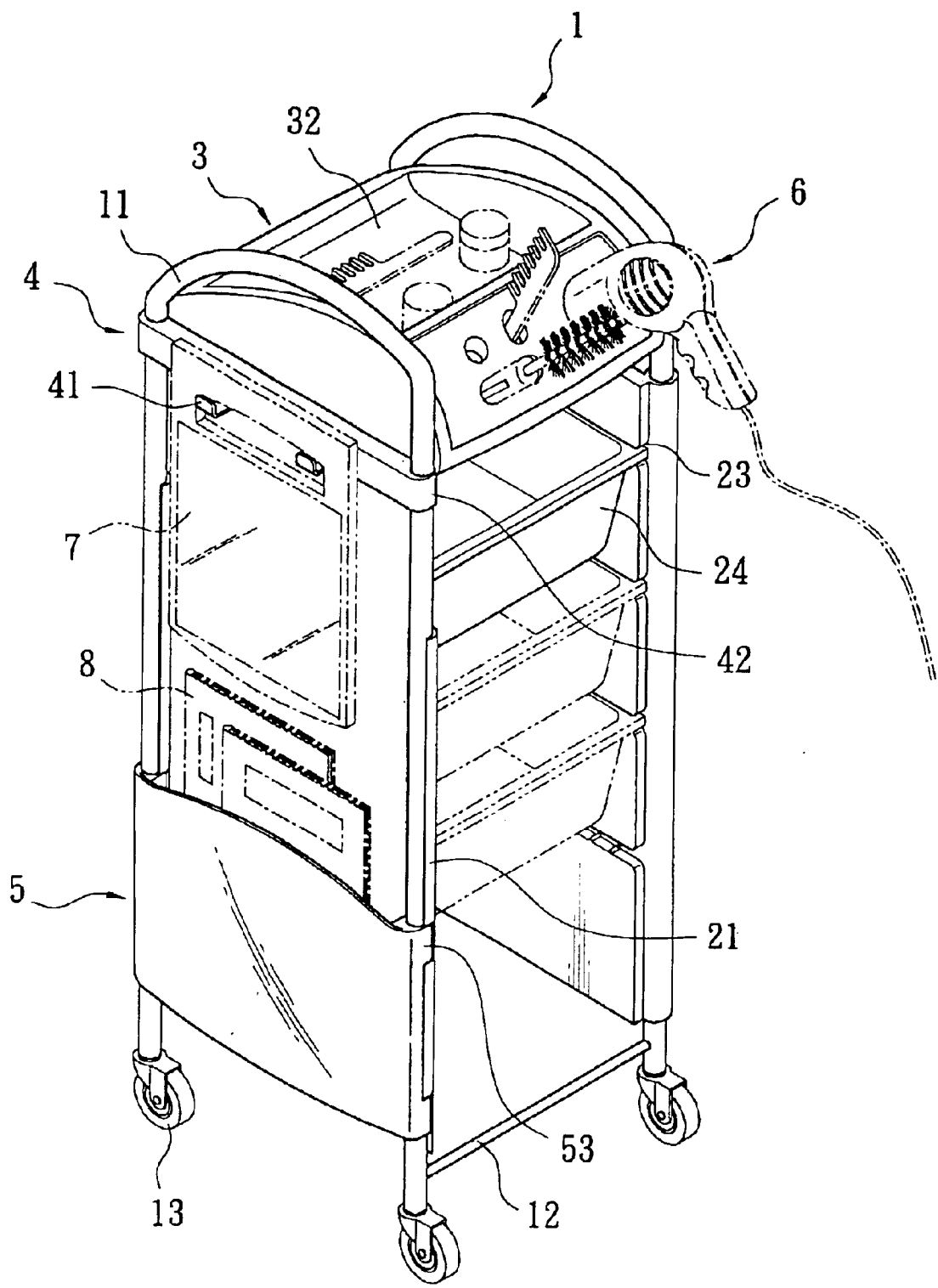
FIG. 5 is a perspective view showing a practical application of the hairdressing tool cart of the present invention.

Also referring to FIG. 5, the frame 1 forms a receptacle 3 comprising a body (not labeled) having a bottom face in which elongated channel-like fitting grooves 33 are defined for fitting over the cross bars 12 located adjacent the top ends of the posts whereby the receptacle 3 is supported in position by the cross bars 12. The receptacle body defines an interior space or a recess 32 in which hairdressing tools and accessories, such as combs, creams, hairdressing glues and the likes, can be received. The receptacle body also forms a front faceplate (not labeled) in which holes 31 are defined. The holes 31 may be of different sizes for receiving and accommodating hairdressing tools and/or accessories, generally designated with reference numeral 6, of different sizes and shapes.

Figure 3:
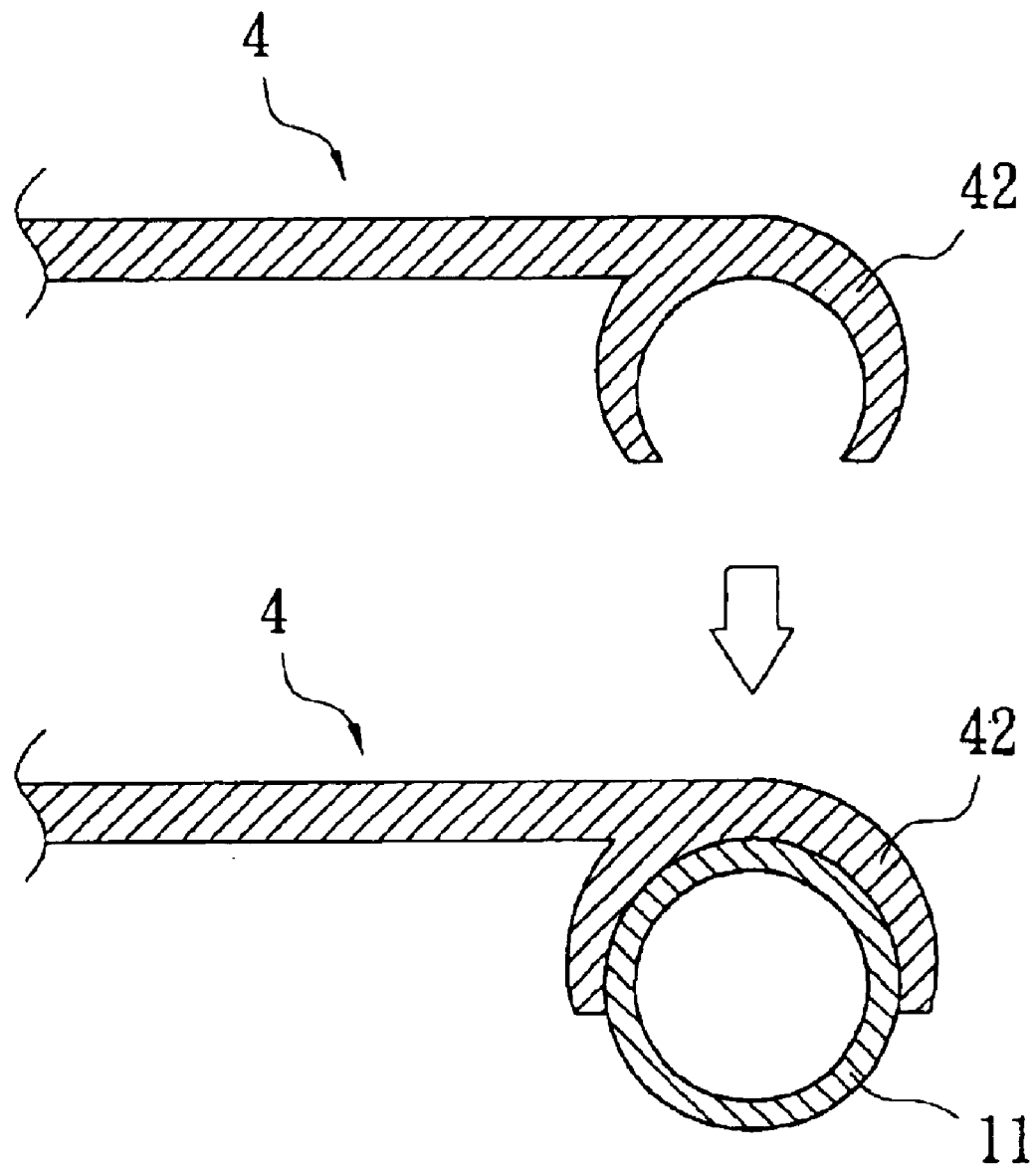
FIG. 3 is cross-sectional views illustrating mounting cross bars to a frame of the hairdressing tool cart.

Also referring to FIG. 3, a hanging rack 4 is attached to an outer side of one of the sub-frames 11. The handing rack 4 has opposite ends each of which forms a channel-like fitting section 42 for removably fitting over the post of the sub-frame 11 to secure the hanging rack 4 is position. Preferably, the hanging rack 4 is fixed at a position adjacent the receptacle 3.

The handing rack 4 forms a plurality of projecting pegs or hooks 41 for hanging and supporting hairdressing tools, such as a mirror 7 illustrated in FIG. 5.

A holder 5 comprises a plate-like member mounted to and spaced from an outer side of one of the sub-frames 11 to define a space having an entry opening 52 for receiving and holding articles, such as magazines 8 illustrated in FIG. 5. The holder 5 has a bottom forming a receiving slot 51 in communication with the entry opening 52 for receiving and holding lower edges of the magazines 8. On each lateral edge of the plate-like member forms two spaced channel-like fitting sections 53 removably fitting over the post of the sub-frame 11 for attaching the holder 5 to the frame 1. In the embodiment illustrated, one of the fitting sections 53 is sized corresponding to the notch 22 defined in the channel-like fitting section 21 of the side board 2 whereby the fitting section 53 is accommodated in the notch 22 without interference therewith.

The side boards 2, the receptacle 3, the hanging rack 4 and the holder 5 are all mounted to the frame 1 by means of releasable fitting sections 21, 33, 42, 53. This allows for arbitrary removal and re-mounting of these parts 2, 3, 4, 5 from/to the frame 1. Thus, a user can re-arrange the parts as desired to form a customer-made cart. Preferably, the fitting sections 21, 33, 42, 53 are of C-shaped channel as illustrated in FIG. 3. The C-shaped cross section allows for deformation of the fitting section for fitting and provides resiliency for securing these parts to the frame 1. Apparently, other releasable fitting or coupling structure can also be employed for selectively mounting/dismounting these parts 2, 3, 4, 5 to/from the frame 1.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A hairdressing tool cart comprising:

a frame comprising two sub-frames spaced from each other and cross bars extending between and connected to the sub-frames, each sub-frame comprising two spaced upright posts;

two side boards selectively and respectively mounted to inner sides of the sub-frames and having a face opposing each other, each board having opposite edges forming a first fitting section for releasably fitting over inner sides of the posts of the sub-frame, the face of the side board forming a plurality of rails on which drawers are movably supported;

a receptacle selectively mounted to the frame and having a bottom on which second fitting sections are formed for releasably fitting over the cross bars thereby supporting the receptacle on the cross bars, the receptacle defining a recessed portion, the receptacle having a face plate in which holes are defined;

a hanging rack selectively mounted to an outer side of one sub-frame, the hanging rack having opposite ends each forming a third fitting section releasably fitting over an outer side of the post of the sub-frame, the hanging rack forming hooks; and a holder selectively mounted to the outer side of one sub-frame and defining a space having an entry opening with the sub-frame, the holder having a bottom forming a receiving slot in communication with the space, the holder having opposite edges each forming at least one fourth fitting section releasably fitting over an outer side of the post of the sub-frame.

2. The hairdressing tool cart as claimed in claim 1, wherein each sub-frame comprises a connection section straddling and connecting top ends of the posts, the connection section being inclined from one post to the other post.

3. The hairdressing tool cart as claimed in claim 1, wherein the posts of the sub-frame have bottom ends to which casters are mounted.

4. The hairdressing tool cart as claimed in claim 1, wherein a notch is defined in the first fitting section for accommodating the fourth fitting section therein when both the side board and the holder are mounted to the same sub-frame.

5. The hairdressing tool cart as claimed in claim 1, wherein each rail forms stop blocks movably received in elongate groove defined in the drawer for limiting the movement of the drawer.

\* \* \* \* \*